United States Patent [19]

Montagu

[11] 4,076,998
[45] Feb. 28, 1978

[54] OSCILLATION MOTOR

[75] Inventor: Jean I. Montagu, Brookline, Mass.

[73] Assignee: General Scanning, Inc., Watertown, Mass.

[21] Appl. No.: 716,535

[22] Filed: Aug. 23, 1976

[51] Int. Cl.$^2$ ............................................. H02K 33/12
[52] U.S. Cl. ....................................... 318/132; 310/36; 310/74
[58] Field of Search ................. 310/25, 29, 26, 36–39, 310/49, 74, 77; 318/128–132; 350/6; 335/229, 230, 272

[56] References Cited

U.S. PATENT DOCUMENTS

| | | | |
|---|---|---|---|
| 3,149,274 | 9/1964 | Hetzel | 318/132 |
| 3,156,857 | 11/1969 | Herr et al. | 318/132 |
| 3,286,109 | 11/1966 | Madsen | 310/49 |
| 3,389,277 | 6/1968 | Fiore | 310/49 |
| 3,610,973 | 10/1971 | Bauer et al. | 310/15 |
| 3,624,574 | 11/1971 | Montagu | 335/230 |

Primary Examiner—Donovan F. Duggan

[57] ABSTRACT

A bearing free oscillation motor has a stator component that defines a cylindrical cavity and a rotor component with a cylindrical portion disposed within the cavity and spaced from the cavity wall by an annular gap of radial width in the range of one-five percent of the diameter of the cylindrical portion. The rotor is supported for rotation about its axis by attachment to one end of a torsion shaft that is fixed at its other end to the stator. The motor may be of either the moving coil or the moving magnet type, that is a permanent magnet provides a magnetic field across the annular gap and electric current flow through a drive winding interacts with the magnetic field to produce a torque that rotationally deflects the rotor. Disposed in the annular gap between the stator and rotor is a low viscosity liquid that produces essentially no viscous damping, for example a hydrocarbon oil, a silicone oil or a polymeric liquid. The sheath of liquid in the annular gap provides radial rotor stability against magnetic, dynamic or other forces that tend to cause radial displacement of the rotor. Rotor damping is provided electrically by feedback of velocity signals proportional to the angular velocity of the rotor.

14 Claims, 8 Drawing Figures

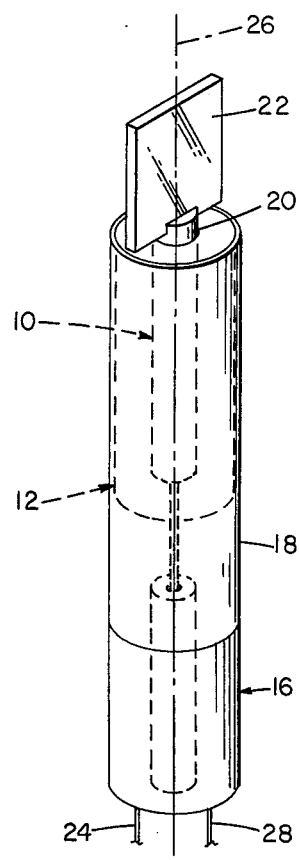
FIG 1
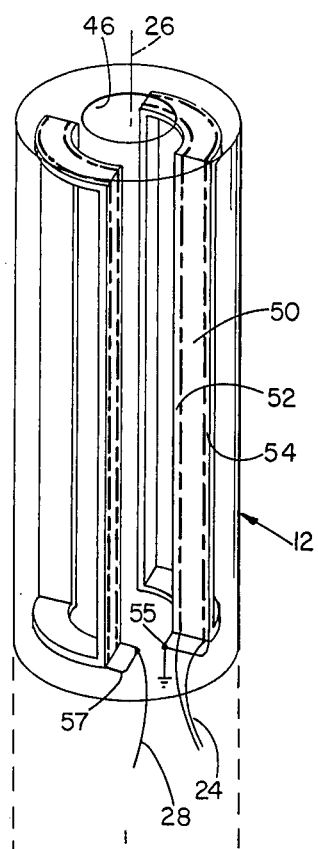
FIG 2
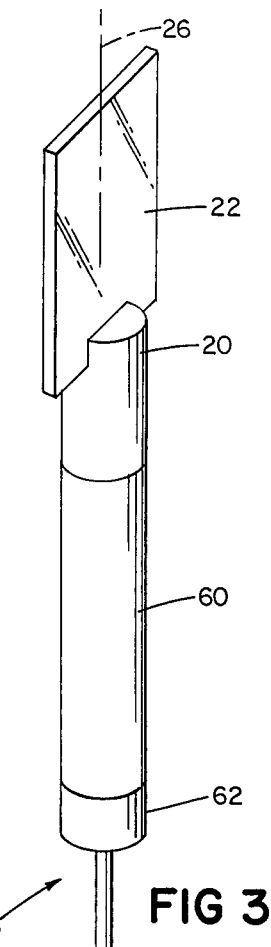
FIG 3
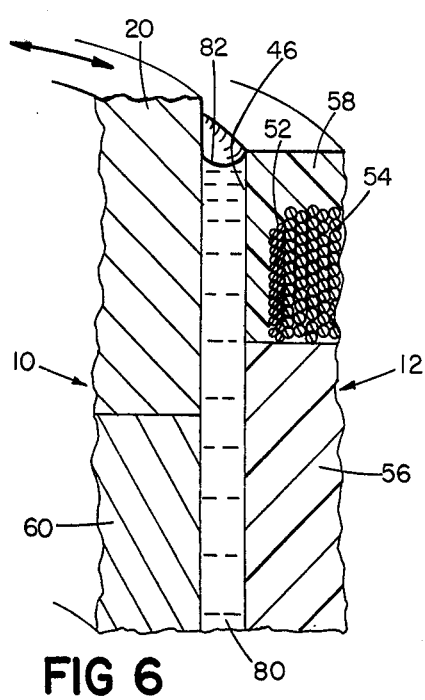
FIG 6
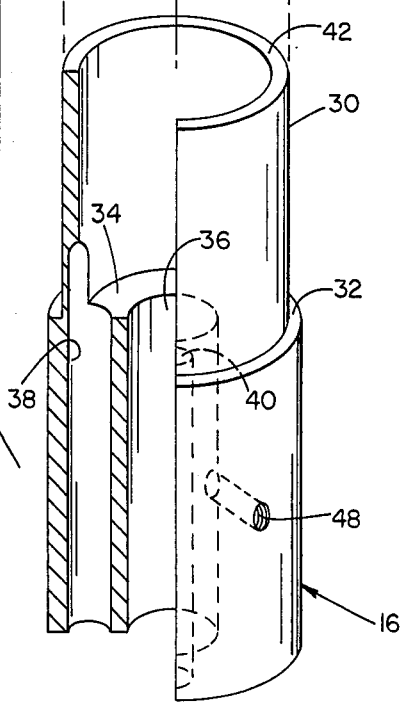

OSCILLATION MOTOR

SUMMARY OF INVENTION

This invention relates to electromechanical transducers and more particularly to oscillation motors useful to deflect, scan, interrupt or chop beams of light, ions, electrons, or other similar streams of low mass.

Oscillation motors are useful in a variety of applications that involve limited rotation in response to an electric current over a large band width and with a high degree of accuracy. Such applications include facsimile machines, optical scanners and video recorders. The oscillation motor rotor is driven by torque produced by interaction between an electric drive current and a magnetic field. The rotors of such motors conventionally have either a rigid radial support system such as is provided with bearings or a torsion shaft support system in which one or both ends of the rotor are secured to an axially extending torsion shaft or shafts. Rigid bearing support systems have disadvantages of cost and limited life and are subject to failure when used in corrosive environments; they also tend to exhibit significant hysteresis characteristics due to metal-to-metal contact. While torsion shaft systems of rotor support has advantages of simplicity, virtually unlimited life, low hysteresis and suitability for use in adverse environments, the rotor lacks the radial stability provided by rigid support systems and accordingly such motors tend to have reduced accuracy and stability. Such motors also tend to be subject to undesirable oscillations and the dynamic response of the rotor must be damped so that the positional response of the rotor to the drive current is precise. An object of this invention is to provide a novel and improved oscillation motor with a single torsion shaft. Another object of this invention is to provide a novel and improved undamped oscillation motor which may be manufactured conveniently and economically.

The invention in one aspect features a bearing free oscillation motor having a stator component that defines a cylindrical cavity. A rotor component has a cylindrical portion disposed within the cavity and spaced from the cavity will by an annular gap of radial widths in the range of one-five percent of the diameter at said cylindrical portion, that radial width preferably being in the range of 0.0015–0.005 inch. The cylindrical rotor and stator surface portions need have only the usual manufacturing finish and dimensional tolerances (e.g. a surface finish of 32 and a dimensional tolerance of ±0.001 inch) and not the extremely precise dimensional and finish tolerances of bearing surfaces. The rotor is supported for rotation about its axis by attachment to one end of a torsion shaft that is fixed at its other end to the stator. The motor may be of either the moving coil or the moving magnet type, that is a permanent magnet on either the stator or the rotor component provides a magnetic field across the annular gap and a drive winding is provided on the other motor component. Electric current flow through the drive winding interacts with the magnetic field to produce a torque that rotationally deflects the rotor. Disposed in the annular gap between the stator and rotor is a low viscosity liquid that produces essentially no viscous damping, for example a hydrocarbon oil, a silicone oil or a polymeric liquid. The sheath of liquid in the annular gap provides radial rotor stability against magnetic, dynamic or other forces that tend to cause radial displacement of the rotor. Rotor damping is provided electrically by feedback of velocity signals proportional to the angular velocity of the rotor so that damping of the motor response is not temperature dependent as in the case of oscillation motors that employ viscous damping.

In preferred embodiments, the rotor portion in the cylindrical cavity has a diameter in the range of 0.1–0.3 inch, a length at least twice its diameter and an annular meniscus of the radial stabilizing liquid is formed at each end of the rotor portion. The cylindrical rotor portion carries the permanent magnet which provides north and south poles in diammetrically opposite axially extending rotor surfaces. That permanent magnet may be of various forms, for example a homogeneous cylinder of magnetic material or a composite sandwich of an axially extending bar magnet between axially extending semi-cylindrical non-magnetic members. The stator includes a drive winding, a tachometer winding and a compensation winding. The tachometer and compensation windings are dimensioned and interconnected so that a mutual inductance signal induced in the tachometer winding by flow of electric current in the drive winding is cancelled by a similar mutual inductance signal induced in the compensation winding and a net velocity signal is produced as a function of the angular velocity of the stator. The rotor is arranged to be driven at a frequency corresponding substantially to the natural oscillation frequency of the oscillating assembly of the torsion shaft and all parts mounted thereon. An optical member such as a scanning mirror is at the free end of the rotor assembly.

The invention provides compact, inexpensive and reliable low hysteresis oscillation motors that have peak-to-peak rotor excursions of up to 60°. The oscillation motors are economically produced in mass production quantities, and provides accurate and high speed response to sinusoidal, ramp and other wave forms over a wide range of repetition rates.

Other features and advantages of the invention will be seen as the following description of a particular embodiment progresses in conjunction with the drawings, in which:

FIG. 1 is a perspective view of an oscillation motor in accordance with the invention;

FIG. 2 is a diagrammatic perspective view of the stator and base components of the motor of FIG. 1.

FIG. 3 is a diagrammatic perspective view of the rotor and torsion shaft components of the motor of FIG. 1;

FIG. 6 is a cross sectional view of a portion of the annular gap at an enlarged scale and taken along the line 6—6 of FIG. 5.

DESCRIPTION OF PARTICULAR EMBODIMENT

Figure 2A:
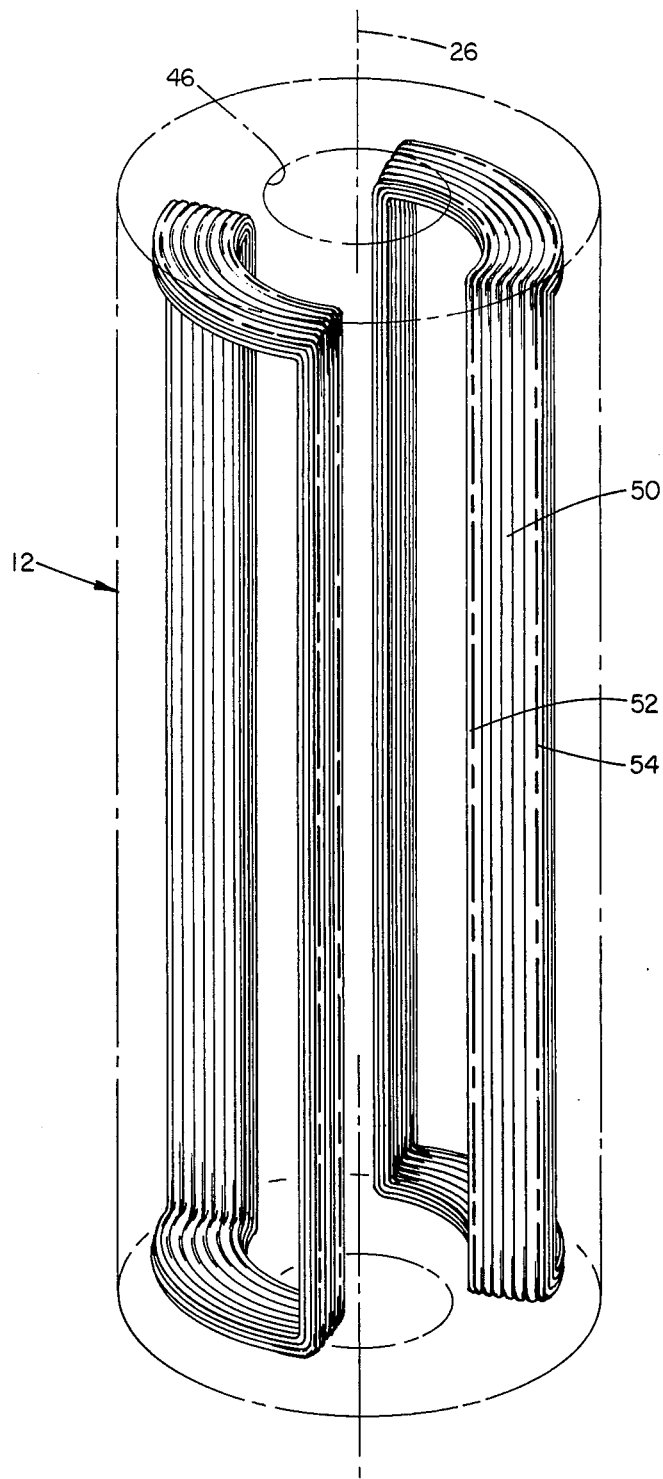
FIG. 2a is a perspective view of the stator component at a larger scale.

The oscillation motor shown in FIG. 1 has rotor component 10 and a stator component 12 in a cylindrical assembly that is ½ inch in diameter and 2 inches in length. That motor includes a brass base 16 and a sleeve 18 of a low loss nickel iron alloy. The output shaft 20 of rotor 10 carries a front surfaced mirror 22 that is attached to shaft 20 with an epoxy adhesive. Drive signals applied over leads 24 produce a reactive torque that rotates shaft 20 and mirror 22 about axis 26. Velocity signals generated in response to rotation of shaft 20 are supplied over lead 28.

With reference to FIG. 2, the base 16 is designed for mounting in a suitable heat sink member of high thermal conductivity and includes at its upper end a tubular section 30, ½ inch in length and 0.12 inch in thickness; an outer annular surface 32 on which the lower end of sleeve 18 is seated; and an inner annular surface 34 in which a central passage 36 and two passages 38, 40 for leads 24, 28, respectively are formed. Threaded radial passage 48 receives a set screw. Seated on the upper surface 42 of tubular section 30 is stator component 12 of plastic material one inch in length, and 0.45 inch in diameter that has a cylindrical surface 46 defining a cavity 0.125 inch in diameter. Encapsulated within stator component 12 are drive winding 50 (350 turns of No. 34 wire), tachometer winding 52 (fifty turns of No. 38 wire) and compensation winding 54 (20 turns of No. 38 wire). Each of these windings is formed in two connected coils on automatic coil winding machinery, the six formed coils are then positioned (three each) on two bobbins 56 and then the six coils are encapsulated with epoxy resin 58 to provide the stator assembly 12 as shown in FIG. 2. Thus each winding 50, 52 and 54 is distributed with equal halves on opposite sides of cavity 46 as indicated in FIGS. 2 and 2a. The tachometer and compensation windings 52, 54 are connected in series opposition as diagrammatically indicated at 55 and 57 and connected to lead 28. The drive winding 50 is connected to leads 24.

The rotor component 10 on which mirror 22 is mounted is shown in FIG. 3 and includes a samarium cobalt permanent magnet 60 that is 0.62 inch in length and 0.120 inch in diameter. The magnet has a residual induction value of at least 7500 Gauss, a coercive force of 7000 Oersteds and a transverse direction of magnetization with a north pole extending axially along one side and an axially extending south pole at the diammetrically opposite surface as indicated in FIG. 6. Bonded to the upper end of magnet 60 with an epoxy adhesive is aluminum mirror mount shaft 20 that is 0.120 inch in diameter. Similarly bonded to the lower end of magnet 60 is aluminum torsion shaft mount 62 that is also 0.120 inch in diameter. Torsion shaft 64 is a cylindrical rod of high carbon steel 0.016 inch in diameter and with an exposed length of 0.75 inch. The upper end of shaft 64 is received in and secured to mount 62 and the lower end of shaft 64 is received in and secured to cylindrical stainless steel holder 66 that has a diameter of 0.1245 inch and a length of 0.75 inch.

The oscillation motor is assembled by inserting leads 24 and 28 through passage 38 and 40, respectively in base 16 and seating the lower surface of the stator component 12 on annular surface 42. Sleeve 18 is then telescopically slid over stator 12 and tubular section 30 and seated on surface 32 of base 16 thus axially aligning the stator 12 and base 16. A mandral is inserted through the aligned stator and base components and the stator is impregnated with epoxy 58. The mandral is then removed and the torsion bar holder 66 is then inserted through cavity 46 of the stator and into the passage 36 of base 16 and secured in position by a set screw received in threaded bore 48. Magnet 60 as supported on shaft 64 is fixed in axial position in cavity 46 as shown in FIG. 4.

Figure 4:
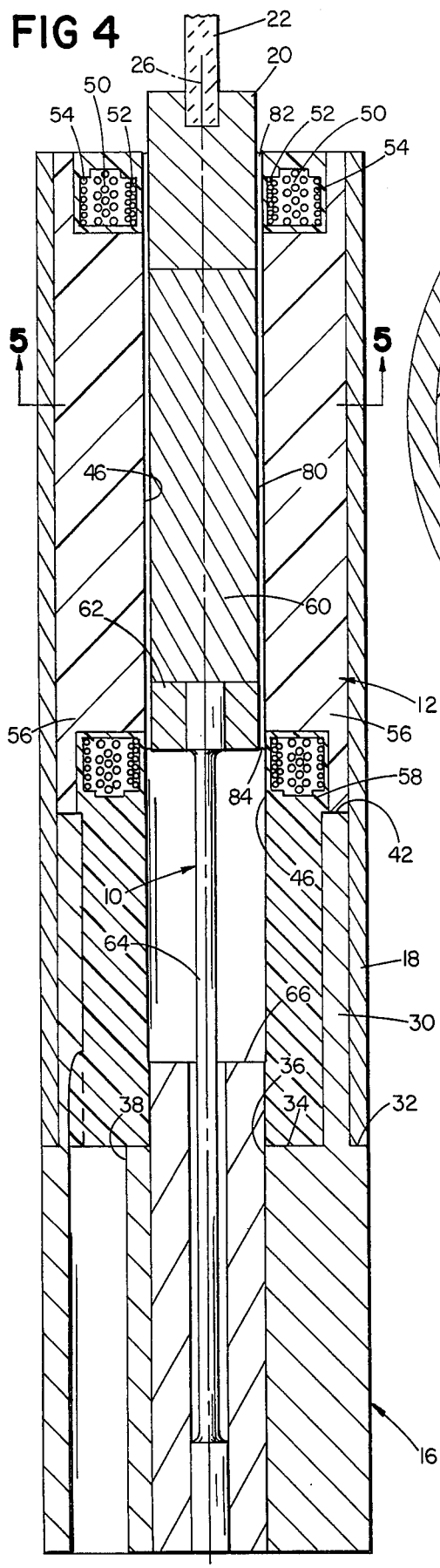
FIG. 4 is a sectional view of the motor of FIG. 1.

As seen in FIGS. 4 and 6, when the rotor-torsion shaft assembly is so secured in the stator-base assembly, magnet 60 is in stator cavity 46 with mirror mounting shaft 20 at the upper end of the stator cavity and torsion shaft mount 62 at the lower end of cavity 46 so that an annular space of 0.0025 inch radial width is provided along the length of the cylindrical cavity 46. Another similar oscillation motor employs a permanent magnet rotor that is 0.62 inch long and 0.18 inch in diameter and has radial gap width of 0.0035 inch. In both motors, the surfaces of both mirror shaft 20 and torsion mount 62 have dimensional tolerances of ±0.001 inch. A layer of liquid 80 of 100 centipoise viscosity extends along the length of this space with an upper annular meniscus 82 between the mirror shaft 20 and the upper end of stator cavity 46 and a lower annular meniscus 84 between the lower end of torsion bar mounting member 62 and cavity 46. This annular liquid layer provides forces tending to maintain the rotor assembly 10 radially centered within the stator bore 46 while imposing essentially no viscous damping on the rotor. Silicone oils, hydrocarbon oils and polymeric liquids are suitable low viscosity liquids. Liquids of somewhat higher viscosity may be used with motors that have larger annular gaps, for example a liquid with viscosity of up to 1000 centipoises may be used in a motor with a larger annular gap. In a particular embodiment a diester liquid with dispersed magnetic particles of 100 Angstrom average dimension is maintained in the annular gap by the magnetic field furnished by magnet 60.

The motor has an amplification factor Q (the ratio of amplitude with a given input current (e.g. one milliampere) at resonant frequency to the amplitude attained with the same input current at 10 Hertz) of ten and a resonant frequency of 500 Hertz. A current of ten milliamperes applied to drive coil 50 at resonant frequency produces angular rotation of ±10° of mirror 22. When the rotor 10 is in motion, hydrodynamic forces tend to increase its radial stability. When driven with a current sensing amplifier, the amplitude frequency response of the motor is under damped. Damping control is provided by feedback of a rotor velocity signal from tachometer winding 52.

Figure 5:
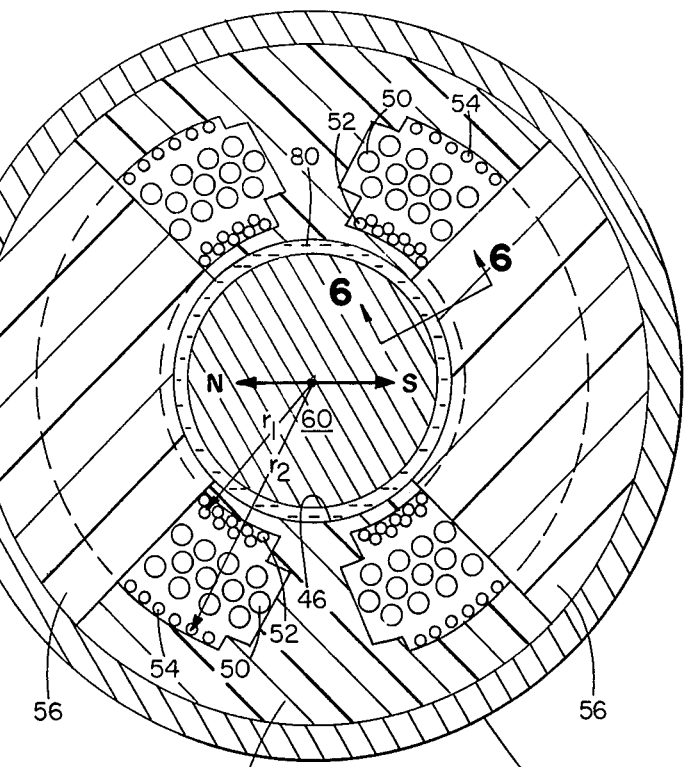
FIG. 5 is a cross sectional view taken along the line 5—5 of FIG. 4.

As indicated above and as shown in FIGS. 2, 4 and 5, the stator 12 has three windings, a three-hundred fifty turn drive winding 50, a 50-turn tachometer winding 52 and a twenty-turn compensation winding 54. Tachometer winding 52 is inside drive winding 50 immediately adjacent surface 46 and spaced at radius $r_1$ from axis 26; while compensation winding 54 is outside drive winding 50 and spaced at radius $r_2$ from axis 26 as indicated in FIG. 6. Tachometer winding 52 and compensation winding 54 each provide a low impedance signal of form:

$$K\omega\, d\theta/dt + K_T\, dI/dt,$$

where $\theta$ is the angular position of the rotor and $I$ is the drive current. The first term of the equation ($K\omega\, d\theta/dt$) is due to rotation of magnet 60 and the second term of the equation ($K_T\, dI/dt$) is due to mutual inductance between the drive winding 50 and the tachometer winding 52 or the compensation winding 54. The number of turns of the tachometer and compensation windings 52, 54 are selected as a function of their respective positions so that the coefficient $K_T$ of winding 52 is the same as the coefficient $K_T$ of winding 54, winding 54 having fewer turns in this embodiment due to its proximity to sleeve 18. Windings 52 and 54 are connected in series opposition so that the signals induced in those windings due to drive current flow in winding 50 cancel. (A balancing potentiometer may be connected in circuit between windings 52 and 54 and lead 28 to provide a trimming cancellation adjustment of the mutual inductance signals if desired.) The coefficient $K_\omega$ of tachometer winding 52 is approximately twice the coefficient $K_\omega$ of compensation winding 54 so that the net voltage on lead 28 is due to rotation of rotor 10 and is proportional to the angular velocity of the rotor.

Figure 7:
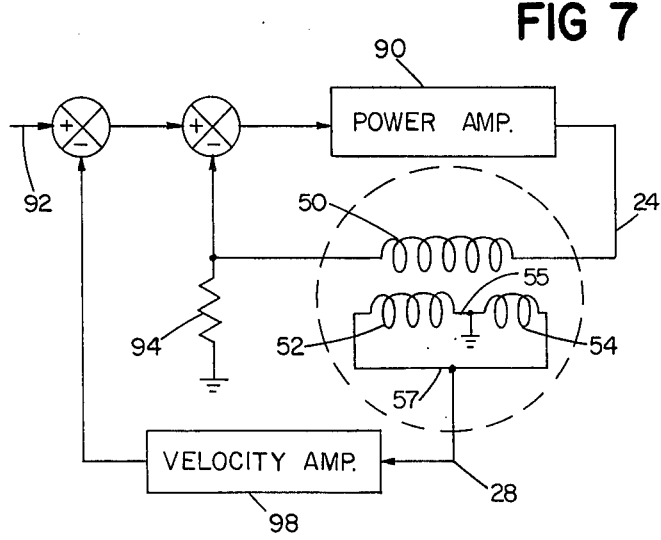
FIG. 7 is a schematic diagram of drive circuitry for the oscillation motor of FIG. 1.

A block diagram of the motor drive circuitry is shown in FIG. 7. That circuitry includes power amplifier 90 connected to respond to a drive signal applied at input 92 and to supply drive current to drive winding 50. The voltage across one ohm sensing resistor 94 is fed back to provide a power amplifier gain of one ampere per volt. Tachometer winding 52 and compensation winding 54 are connected in series opposition by connections 55, 57 and the winding loop is connected to lead 28. The mutual inductance signals are equal in magnitude and buck each other and the resulting net velocity signal is applied over lead 28 to velocity amplifier 98 and fed back to modify the drive signal and damp the angular response of the oscillation motor.

It will be understood that numerous variations in the specific details will occur and are within the spirit and scope of the invention.

What is claimed is:

1. A bearing free oscillation motor comprising
   a stator defining a cylindrical cavity,
   a rotor having a cylindrical portion disposed within said cavity, said cylindrical portion having a diameter that provides an axially extending annular gap between said cylindrical portion and said cylindrical cavity of radial width in the range of one-five percent of the diameter of said cylindrical portion,
   a low viscosity liquid in said gap that provides essentially no viscous damping of said rotor,
   an axially extending torsion shaft having one end secured to said stator, and its other end secured to said rotor for fixing the axial position of said cylindrical portion in said cylindrical cavity and permitting limited rotational oscillation of said rotor,
   one of said stator and said rotor carrying a permanent magnet that provides a magnetic field transverse to the axis of rotation of said rotor, a drive winding on the other of said stator and said rotor for receiving an electric current flow that interacts with said magnetic field to produce a torque that rotationally deflects said rotor,
   and a tachometer winding responsive to rotational deflection of said rotor for feeding back a velocity signal to electrically damp rotational motion of said rotor.

2. The motor of claim 1 wherein the viscosity of said liquid at 20° C is less than one thousand centipoises.

3. The motor of claim 2 wherein said liquid has magnetic particles dispersed therein and said liquid is held in said annular gap by said magnetic field.

4. The motor of claim 1 wherein the length of said cylindrical portion within said cavity is at least twice the diameter of said cylindrical portion.

5. The motor of claim 1 and further including a beam modifying element secured to the free end of said rotor.

6. The motor of claim 1 wherein said liquid has an annular meniscus at each axial end of said annular gap.

7. The motor of claim 1 wherein said drive winding and said tachometer winding are on said stator and further including a compensating winding adjacent said drive winding and connected in circuit with said tachometer winding to cancel a signal induced in said tachometer winding due to electric current flow in said drive winding while providing a net velocity signal to electrically damp rotational motion of said rotor.

8. The motor of claim 1 wherein said permanent magnet is of a rare earth alloy.

9. The motor of claim 1 wherein said motor has a Q of at least five and said permanent magnet is carried by said rotor and is disposed in said stator cavity.

10. The motor of claim 9 wherein said drive winding and said tachometer winding are on said stator and further including a compensation winding adjacent said drive winding and connected in circuit with said tachometer winding to cancel a signal induced in said tachometer winding due to electric current flow in said drive winding while providing a net velocity signal to electrically damp rotational motion of said rotor.

11. The motor of claim 10 and further including a beam modifying element secured to the free end of said rotor.

12. The motor of claim 11 wherein the viscosity of said liquid at 20° C is less than two hundred centipoises.

13. The motor of claim 12 wherein said permanent magnet is a cylindrical member of a rare earth cobalt alloy.

14. The motor of claim 13 wherein said liquid has magnetic particles dispersed therein and said liquid is held in said annular gap by said magnetic field.

* * * * *